United States Patent [19]

Widenbäck

[11] Patent Number: 4,860,384
[45] Date of Patent: Aug. 29, 1989

[54] SLEEVE ARRANGEMENT AND METHOD OF MANUFACTURE THEREOF

[75] Inventor: Ralph H. Widenbäck, Stenungsund, Sweden

[73] Assignee: New Pac Systems AB, Sweden

[21] Appl. No.: 120,625

[22] Filed: Nov. 13, 1987

[30] Foreign Application Priority Data

Nov. 14, 1986 [SE] Sweden ............................ 8604882

[51] Int. Cl.⁴ .............................................. D05B 3/00
[52] U.S. Cl. ............................................ 2/115; 2/125
[58] Field of Search ...................... 2/115, 125, 227, 2, 2/82, 409, 404, 407

[56] References Cited

U.S. PATENT DOCUMENTS

| | | | |
|---|---|---|---|
| 4,103,363 | 8/1978 | Connor | 2/227 |
| 4,171,076 | 10/1979 | Connor | 233/72 |
| 4,455,683 | 6/1984 | Moretti | 2/2 |
| 4,493,116 | 1/1985 | Truman | 2/117 |
| 4,561,126 | 12/1985 | Truman | 2/115 |
| 4,683,593 | 8/1987 | Langley | 2/82 |

Primary Examiner—Ronald Feldbaum
Attorney, Agent, or Firm—Ostrolenk, Faber, Gerb & Soffen

[57] ABSTRACT

A sleeve arrangement on garments, protective aprons or protective clothing having a whole and unbroken front piece entails the material for the sleeves being in one piece and joined along a substantially coherent, preferably continuous join extending around both shoulders and straight across the upper and lower portion of the chest, and the two adjacent material segments lying within the join definition being removed to produce one common aperture for both sleeves.

A method of manufacturing the sleeves of garments, protective aprons or protective clothing having a whole and unbroken front piece comprises stitching, glueing or welding the coherent sleeve piece to the front piece of the garment, preferably in a single continuous operation, along a substantially coherent, preferably continuous join extending around both shoulders and across the upper and lower portion of the chest, and removing the two adjacent material segments lying within the join definition to produce one common aperture for both sleeves.

12 Claims, 2 Drawing Sheets

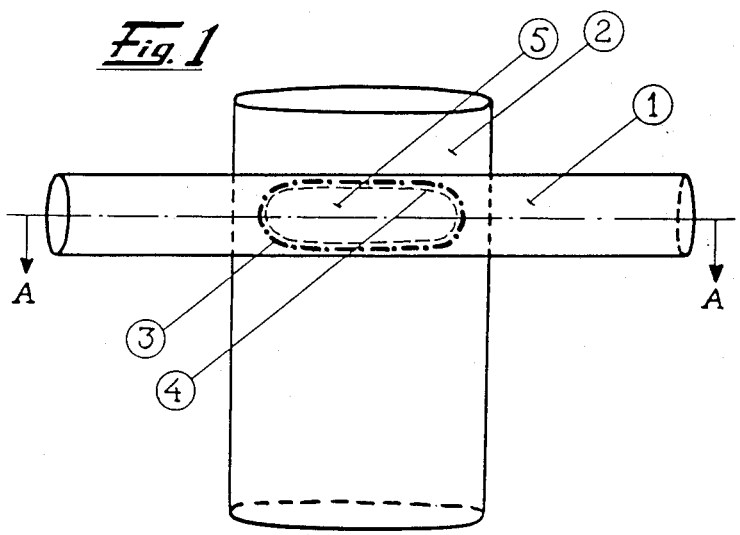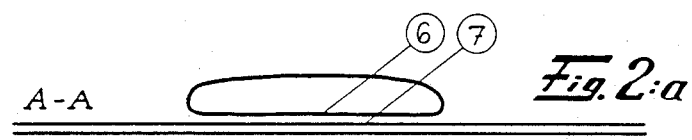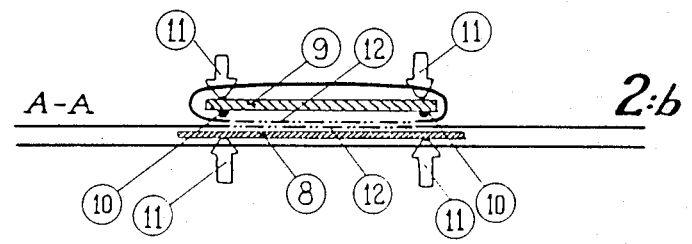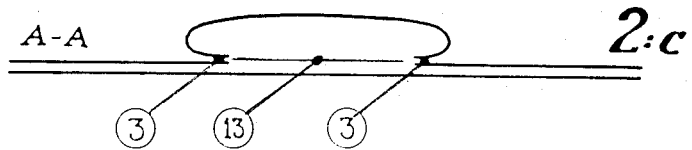

SLEEVE ARRANGEMENT AND METHOD OF MANUFACTURE THEREOF

The invention relates to a sleeve arrangement on garments, protective aprons or protective clothing hereinafter referred to collectively as garments.

The arrangement comprises the pieces of material necessary for sleeves and body. The essential feature is substantially the provision of a single aperture in the body of the garment allowing easy access to both sleeves.

The invention also relates to a method of manufacturing the sleeve arrangement according to the invention.

The method which facilitates manufacture comprises joining the pieces of material for sleeves and body. The pieces of material can be joined in a single operation and with a continuous seam, around the common body aperture for the two sleeves.

BACKGROUND OF THE INVENTION

When manufacturing clothing of various types, the most complicated operation is usually that of joining the sleeves to the body piece. Irrespective of the material used, joining the sleeves usually involves several operations of varying complexity and taking varying amounts of time, which is directly reflected in the price of the garment.

The mere fact of the sleeves being located one on each side of the body piece necessitates at least two work operations. With the object of simplifying manufacture, it is already known to start with two pieces of material—a front piece and a back piece, each provided with projecting sleeve pieces on each side. Joining these pieces along only the sides/lower arms and upper arms/shoulders reduces manufacture to four operations.

Stitched or welded seams are generally executed in the horizontal plane and can only be performed on two layers of material at a time. When the sleeve material, usually cylindrical in shape, is attached to the body piece, which may be flat, a third layer of material may easily catch in the seam. This layer of material must then gradually be turned aside or screened from the welding heat of attachment, thus further complicating attachment.

To avoid such operations, it is also known to turn the work-pieces inside out, turning them the right way again after joining. The result is in any case several work operations, both before, during and after the actual joining process.

SUMMARY OF THE INVENTION

Characteristic of the invention is that the armhole extends in an oval straight across the body piece from one side to the other. Part of the sleeve piece thus also constitutes a part of the front or back of the body piece. Each of the body piece and the sleeve piece have respective overlying joining sections which are surrounded by a common boundary defined by seams or welds.

Also characteristic of the invention is that the sleeve piece is common to both sleeves and that the joint to the body piece can form a common armhole for both sleeves, allowing convenient access from inside the body piece.

The method according to the invention is based on the manufacture of garments of the following type: protective aprons or protective clothing, having a whole and unbroken front piece and of such a nature as to prevent access from the front. All the material for the two sleeves is made of one piece. The body piece is joined to the sleeve member by a preferably continuous boundary joint producing two adjacent overlying joining sections of the sleeve member and body piece lying within the boundary. These joining sections are both removed to allow access to both sleeves from inside the garment. These garments are characterized substantially by the technology, advantageous from the manufacturing point of view, of joining the sleeve piece to the body piece along a single coherent join around an area within which one or two openings (armholes) through the material layers provide access for the arms to the sleeves, i.e. the end portions of the common sleeve piece. Preferably a single opening is provided, to simplify a threading of the arms into the both sleeves.

Also characteristic of the invention is that the joining process is preferably performed in a single operation.

The invention will be described in the following by way of example, with reference to a non-limiting embodiment, referring to the accompanying drawings. The designations are in sequence and apply to all the figures.

BRIEF DESCRIPTION OF THE ACCOMPANYING DRAWINGS

FIG. 1 shows in a horizontal view the main principle of the sleeve arrangement where the common piece of material (1) for the two sleeves has been placed straight across the body piece (2) and joined by a joining section (3). The garment according to the invention is then produced by removing the segments of material lying within the joining section (3) boundaries along the edge (4) so that the sleeves are reached via a common aperture.

FIGS. 2a-c show a vertical section along the line A—A in FIG. 1, presenting the advantageous method of manufacture starting from cylindrical sleeve and body pieces.

In FIG. 2a the adjacent material surfaces (6, 7) in the body and sleeve pieces, respectively, after being placed crosswise, will overlap each other in a parallel plane.

FIG. 2b shows the support (8) and welding tool (9) with welding profile (10) which can be inserted into the spacious pieces of material to join them in a single operation by means of a long, substantially continuous joining section (3).

FIG. 2c shows the result after the welding tool has been briefly pressed (11) against the support and the two material segments (12) within the boundary of the joining section (3) have been removed, thus allowing access to the two sleeves through a common armhole (13), from inside the body piece.

Figure 3:
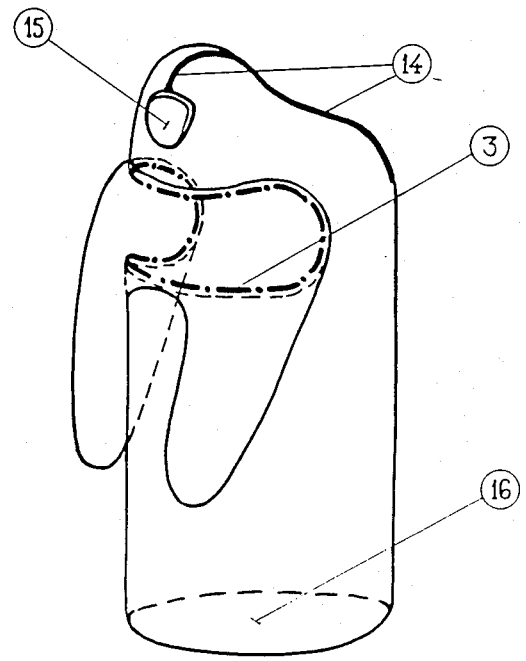
FIG. 3 shows in perspective a non-limiting example of the garment intended to function as a protective or clearance outfit of disposable nature. It is sealed by a weld (14) at the top, provided with a breathing space (15) at face level and is open at the bottom (16) to enable it to be passed over the head.

The sleeve arrangement according to this embodiment of the invention offers advantages from the purely manufacturing point of view as well as from the user's point of view, giving convenient access to both sleeves from the common armhole (13) even after the body portion (2) has been put on.

DESCRIPTION OF SPECIFIC EMBODIMENT

FIG. 1 shows how the sleeve piece (1) is placed flat across the body piece (2) and joined along a substantially coherent joining section (3) running across the breast and around the shoulders, after which the two segments of material lying within the joining section definition are removed along the edge (4), thus producing the common armhole for the two sleeves.

FIGS. 2 (a-c) show three vertical projections of the method of manufacturing the sleeve arrangement according to the invention. The starting position in FIG. 2a, with the pieces of material laid crosswise against each other, provides two adjacent, flat, parallel surfaces (6, 7) ready to be joined.

With the aid of a weld support (8) inserted in the sleeve piece (1) and a welding tool (9) inserted in the body piece (2), FIG. 2, the joining (3) can be performed in a single operation.

The material segments (12) lying within the weld seam (3) are removed and FIG. 2c shows the resultant common armhole (13) for the two sleeves.

Without being limited thereto, the sleeve arrangement and the method of its manufacture according to the invention, are particularly suitable for manufacturing garments in the form of protective or clearance outfits. Furthermore, this type of garment is usually made out of inexpensive material for disposable use and ease of manufacture is generally of more concern than attractive appearance.

FIG. 3 shows such an embodiment in perspective. The protective garment (2) is welded (14) together at the top and provided with a breathing space (15). The wearer's head is inserted through the opening (16) at the bottom and the garment is then pulled down over the body.

With the arms in horizontal position across the chest, it is then easy by means of "swimming movements" with both arms simultaneously inside the garment, to reach the common armhole for the two sleeves.

Preferably the sleeve piece is connected to the continuous uncut front or back of the garment.

I claim:

1. A protective garment comprising:
   a body section having a continuous vertical panel;
   a substantially tubular sleeve member defining sleeves for receiving both of a wearer's arms; the sleeve member being secured to and extending transversely of the vertical panel around a continuous boundary defining a respective joining section in both the sleeve member and the panel, the joining sections overlying each other and being of a length along the sleeve member and also of a height sufficient for a wearer's arms to pass through the joining sections into the sleeve member;
   the joining sections of the sleeve member and of the panel, being removed around the boundary for forming an opening into the sleeve member for access of the wearer's arm from the interior of the body section behind the panel and into the sleeve member.

2. A sleeve arrangement according to claim 1, wherein the joining sections extend around both shoulders and straight across the upper and lower portion of the chest.

3. A sleeve arrangement according to claim 1, wherein the two overlying joining sections of the body section and the sleeve member are removed to produce a single access aperture from the body section for both of a wearer's arms into the sleeves.

4. The protective garment of claim 1, wherein the sleeve member extends on both sides beyond the vertical boundaries of the vertical panel.

5. The protective garment of claim 1, comprising a generally tubular body section extending transversely of said tubular sleeve member of which the vertical panel is a part.

6. The protective garment of claim 5, wherein the vertical panel comprises the front of said protective garment.

7. The protective garment of claim 1, wherein the vertical panel comprises the front of said protective garment.

8. A sleeve arrangement according to claim 2, wherein the joining sections are are removed to produce a single access aperture for both arms to the sleeves.

9. A method of manufacturing sleeves on a garment, the garment having a whole and unbroken front body piece of such a nature as to prevent access through the front piece, comprising securing a sleeve member for both sleeves to the front body piece along a boundary for defining substantially continuous overlying joining sections on both of the body piece and the sleeve member, and removing the two adjacent overlying joining sections from the sleeve member and the body piece lying within the boundary to allow access to both sleeves from inside the body piece.

10. A method to claim 9, wherein the joining sections are made to extend around both shoulders and straight across the upper and lower portion of the chest.

11. A method according to claim 9, wherein the joining sections are removed to produce one aperture for both arms to the sleeves.

12. A method according to claim 5, wherein the joining sections are removed to produce one aperture for both arms to the sleeves.

* * * * *